United States Patent [19]

Fontenot

[11] Patent Number: 4,810,459
[45] Date of Patent: Mar. 7, 1989

[54] METHOD AND APPARATUS FOR DETERMINING TRUE FORMATION POROSITY FROM MEASUREMENT-WHILE-DRILLING NEUTRON POROSITY MEASUREMENT DEVICES

[75] Inventor: John E. Fontenot, Houston, Tex.

[73] Assignee: NL Industries, Inc., Houston, Tex.

[21] Appl. No.: 211,109

[22] Filed: Jun. 21, 1988

Related U.S. Application Data

[63] Continuation of Ser. No. 807,306, Dec. 10, 1985, abandoned.

[51] Int. Cl.$^4$ ............................................. G01V 5/00
[52] U.S. Cl. ...................................... 376/160; 376/165; 250/254; 250/256
[58] Field of Search ................. 376/160, 165; 250/254, 250/256

[56] References Cited

U.S. PATENT DOCUMENTS

| | | | |
|---|---|---|---|
| 2,936,375 | 5/1960 | McKay | 376/165 |
| 3,908,122 | 9/1975 | Hartsell | 250/269 |
| 3,993,903 | 11/1976 | Neuman | 250/256 |
| 4,002,903 | 1/1977 | Pitts, Jr. et al. | 376/165 |
| 4,005,290 | 1/1977 | Allen | 376/160 |
| 4,550,392 | 10/1985 | Memby | 367/82 |
| 4,577,102 | 3/1986 | Sherman et al. | 250/256 |

FOREIGN PATENT DOCUMENTS

| | | | |
|---|---|---|---|
| 0791956 | 12/1980 | U.S.S.R. | 250/256 |
| 2136562 | 9/1984 | United Kingdom | 250/256 |

Primary Examiner—Harvey F. Behrend
Attorney, Agent, or Firm—Browning, Bushman, Zamecki & Anderson

[57] ABSTRACT

A method and apparatus for determining true formation porosity utilize downhole measurement-while-drilling neutron porosity measurement devices. A initial measurement is taken shortly after the formation is bored and before any substantial invasion by the drilling fluid occurs. Subsequent measurements are made until a steady, no longer increasing, measurement is reached indicating saturation of the formation by the drilling fluid to the depth of the measurements. The steady measurement is indicative of the true porosity of a gas containing formation while the difference between the initial and steady measurements is indicative of the gas saturation of a gas containing formation.

2 Claims, 1 Drawing Sheet

METHOD AND APPARATUS FOR DETERMINING TRUE FORMATION POROSITY FROM MEASUREMENT-WHILE-DRILLING NEUTRON POROSITY MEASUREMENT DEVICES

This is a continuation of co-pending application Ser. No. 807,306 filed on Dec. 10, 1985 now abandoned.

BACKGROUND OF THE INVENTION

1. Field of the Invention

The present invention relates to a method and apparatus for determining the actual porosity of strata being drilled using measuring-while-drilling techniques.

2. Description of the Prior Art

The search for hydrocarbons beneath the earth's surface requires a detailed knowledge of the structure of the various strata penetrated in order to evaluate the potential commercial value of the raw material which can be withdrawn from the strata. One of the most important pieces of data is the porosity of the strata which gives an indication of the void space in a layer which can be filled with gas or oil. There have been several techniques developed to measure the porosity of the formation surrounding a borehole. One technique employs a tool carrying an acoustic transmitter with one or more acoustic receivers spaced from the transmitter. The velocity of sound transmitted through the formation from the transmitter to the receivers is measured. Its reception is related to the porosity, since sound travels faster in less porous rocks than in fluid-filled pore spaces in earth formations. Another technique involves the use of gamma ray sources and at least one detector spaced therefrom to measure the electron density of the earth formations by gamma ray scattering. This technique leads to an inferential measurement of the porosity of the formation. A further known technique employs a neutron source and either a neutron or gamma ray detector sensitive to low energy, or thermalized, neutron density. Hydrogen is the principle agent responsible for the slowing down of neutrons emitted into earth formations. Therefore, in a formation containing a larger amount of hydrogen than is present in low porosity formations, the neutron distribution is more rapidly slowed down and is contained in the area of the formation near the source. Thus, the counting rates in remote thermal neutron sensitive detectors located several inches or more from the source will be suppressed. In lower porosity formations which contain little hydrogen, the source neutrons are able to penetrate further. Thus, the counting rates in the detector or detectors are increased.

The latter of the above techniques can use the teachings of U.S. Pat. No. 3,566,177 in which the porosity, commonly referred to as the "neutron porosity," derived from a neutron-neutron logging tool may be compared with the value of porosity, commonly referred to as the "density porosity," derived from a gamma-gamma formation density logging tool of the type disclosed in U.S. Pat. No. 3,321,625, in order to detect the presence of hydrocarbon gas in a formation.

Porosity measurements are most often performed by dual detector neutron porosity wireline logging tools provided with a neutron emitting source that irradiates the formation being studied. The tool typically is forced against one side of the borehole wall by laterally extending arms. The resulting neutron population is sampled by a pair of neutron detectors spaced at different distances from the neutron source. A tool of this type is disclosed in U.S. Pat. No. 3,482,376. If a two-detector measurement is made at a sufficient distance from the source, the effect of the borehole size and tool standoff are minimized by taking the ratio of the counting ranges. A function former or equivalent system then conveniently converts the ratio into a signal that represents otherwise uncorrected formation porosity. Unwanted contributions to the "ratio porosity" may include contributions from elements of the environment of the investigation such as the tool standoff, borehole size, mud weight, mud cake thickness, borehole salinity, formation salinity, etc. Correction for these environmental effects is subsequently conveniently accomplished in a separate operation by reference to a plurality of log interpretation charts which are readily available. Such an interpretation of logging results is obviously cumbersome and a hindrance to on-site interpretation of logging results. This is also a procedure which cannot be carried out while drilling.

Most commercial dual detector neutron logging has been accomplished with thermal neutron detectors due to the fact that reasonable counting rate statistics are obtainable at source detector spacings which yield values of porosity that are not too badly degraded by borehole environmental effects. Because the measurement of porosity is based on the detection of thermal neutrons, the presence of thermal neutron absorbing elements in the formation or the borehole complicates the interpretation of the results. Such elements in the formation are commonly associated with clay and/or salt water. It is known that information on clay types can be derived by means of logging tools that detect natural radioactivity. Unfortunately, the elements responsible for the natural radioactivity of clay are not the same as the thermal absorbers that interfere with the neutron logging tool. The importance of the influence of thermal neutron absorbers in a borehole or formation becomes apparent when it is understood that the comparison of "density porosity" with "neutron porosity", in order to obtain an indication of hydrocarbon gas, becomes suspect where there are thermal neutron absorbers in the formation.

The prior art technique of inferring the true porosity from measurements made with at least two different kinds of porosity sensors are discussed in *Fundamentals of Formation Evaluation* by Donald P. Helander, OGCI Publications, Tulsa, in combination with any of the Dresser or Schlumberger standard log interpretation manuals. One of the most common ways of doing this is to cross-plot porosity derived from gamma-gamma density measurements with porosity derived from a neutron porosity measurement.

A gamma-gamma density sensor measures only electron density. Its configuration is similar to that of a neutron porosity sensor, but the neutron source is replaced by a source of gamma rays and the detectors are gamma ray sensitive. Gamma rays lose energy in the formation through a number of mechanisms. For the range of energies used in a gamma-gamma density sensor, the primary mechanism of energy loss is scattering of the electrons, which is known as Compton scattering. Generally, densities increase with atomic number. Thus, as the density of the medium increases, so does the electron density. Therefore, the energy loss of gamma rays and scattering through a dense medium is greater than for scattering through a light medium. By monitoring the flux of gamma rays at some position uphole from the source, one can determine the electron density of the formation. As the density of a formation increases, the observed flux decreases. Porosity is derived from such density measurements by estimating the true density of the formation matrix, i.e. the rock making up the formation, and the true density of the fluids in the formation.

If there is gas in a formation, a gamma-gamma density derived porosity will tend to be high, while a neutron porosity measurement will tend to be low. A cross plot of the two logs thus serves as an indicator of the presence of gas. There are, however, a number of difficulties. The most common of these problems involves shale because shales contain a large amount of bound water, and the porosities of shale appear to be typically about 40% when measured by a porosity sensor. In fact, they typically have a low porosity.

The presence of shales can be distinguished on the basis of readings of natural gamma ray background; the shales are more radioactive than clean sands. Likewise, the percentage of shale in a sand can be estimated from the natural gamma ray background. The shale percentage can be used with the density derived porosity and the neutron porosity measurements to provide an indication of gas saturation. It will often happen that the shale volume as estimated using the natural gamma background is larger than the shale volume estimated using coordinates established in the cross plot. The reduced shale volume observed in the cross plot is due to the presence of gas and can be compensated for by appropriate adjustment of the graph interpretation.

A big drawback of all of the prior art thus far discussed is the fact that it cannot be used during the drilling operation. Instead, the drilling operation must be stopped, the drill string withdrawn and a wireline tool lowered in the borehole to take the various measurements. This is a time consuming and therefore very costly procedure.

SUMMARY OF THE INVENTION

The present invention constitutes an improvement over the prior art methods of determining porosity in that it obviates the use of wireline tools by enabling porosity measurement o be accurately taken with measuring-while-drilling tools shortly after the borehole is drilled when the effects of invasion are negligible. The present invention utilizes measuring-while-drilling neutron density sensors to make measurements over a measured time period. As time elapses, drilling fluid will invade a formation and displace gas filled voids until a radius beyond the depth of investigation is saturated. Repeated measurement of the same zones with the same neutron density sensor after invasion will therefore produce a higher porosity than what was observed before. The difference in the readings before and after invasion will be a true indication of the presence of natural gas in the formation. The porosity measured at the time of invasion beyond the sensor's depth of investigation will be a true indication of porosity.

DESCRIPTION OF THE PREFERRED EMBODIMENT

Figure 1:
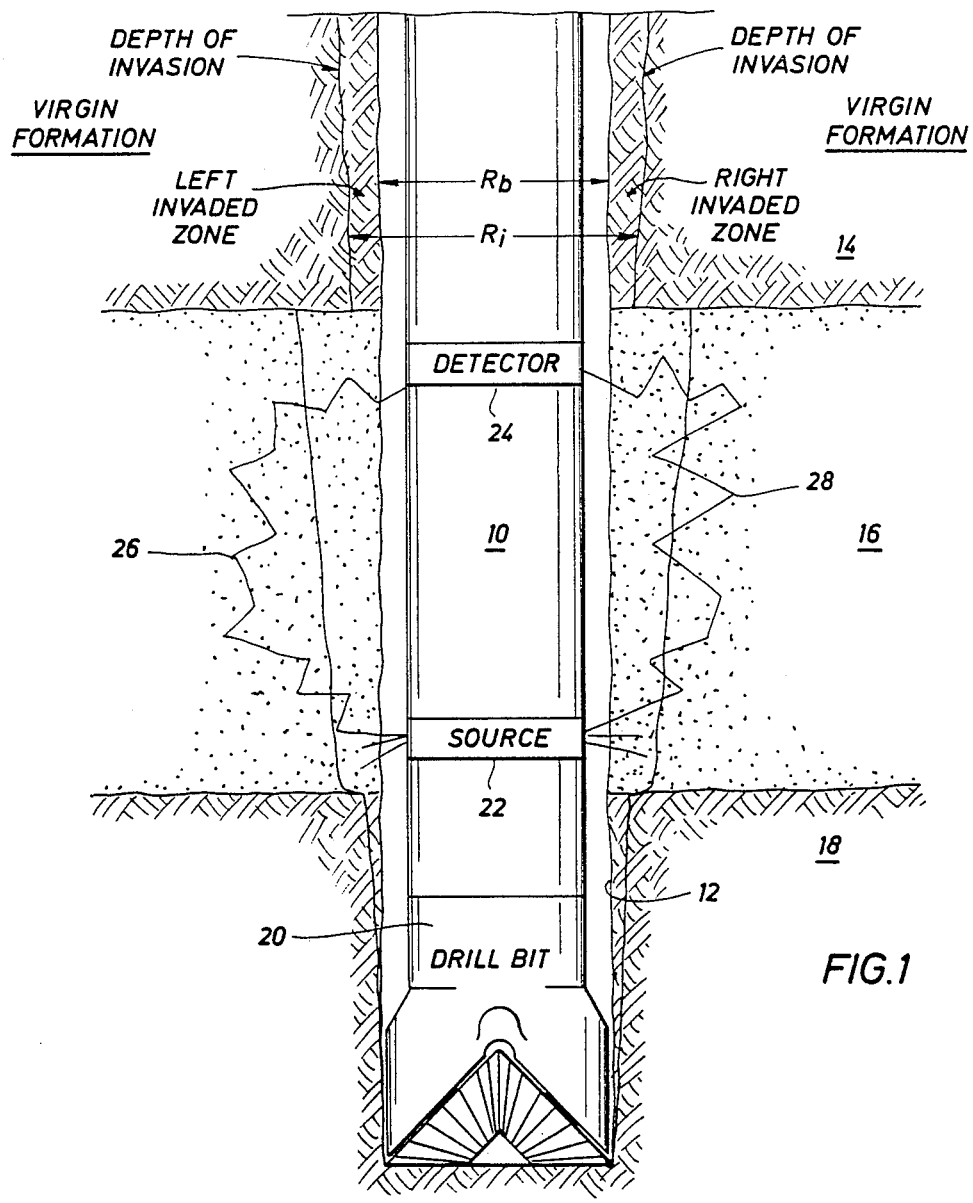
FIG. 1 is a diagrammatic side elevation partly in section, of a borehole during drilling illustrating measurement of the porosity of the surrounding formation in accordance with the present invention, the invasion of the formations being exaggerated.

The elements of a neutron porosity sensor in accordance with the present invention are shown in FIG. 1. In this Figure, a drill string 10 has drilled a borehole 12 through formations 14, 16, 18. The drill string has on its lower end a drill bit 20 and spaced upwardly therefrom is a neutron source 22 with at least one detector 24 spaced along the drill string from the source 22. The measurement is accomplished by scattering neutrons, schematically indicated by the erratic lines 26, 28, from a chemical source, such as Americum Beryllium into the formation. Other neutron sources are also available. Since hydrogen has the lowest atomic weight of all naturally-occurring elements, a neutron will lose more energy in collision with a hydrogen atom than with any other kind of atom. All other elements occuring in any significant abundance in the borehole and adjacent formation are considerably more massive than hydrogen. Thus, the dominant energy loss mechanism in the scattering of neutrons in a formation is the scattering of neutrons from hydrogen atoms. After a sufficient number of scatterings, the neutrons are nearly in thermal equilibrium with their environment. Sometime after this, they will be captured by an atomic nucleus, at which time a gamma ray may be given off. It can be understood from FIG. 1 that the flux of neutrons at a given distance of the borehole from the source decreases as the amount of hydrogen in the formation increases. Thus, neutron porosity sensors more accurately provide a measurement of the hydrogen content of a formation rather than porosity. Porosity is generally inferred by assuming that all of the pore space is filled with water. This can be quite misleading, especially if gas is present. At first approximation, any portion of the porosity which is gas filled will not be seen by a neutron porosity sensor meaning that porosity readings in a gaseous zone will always be low.

Figure 2:
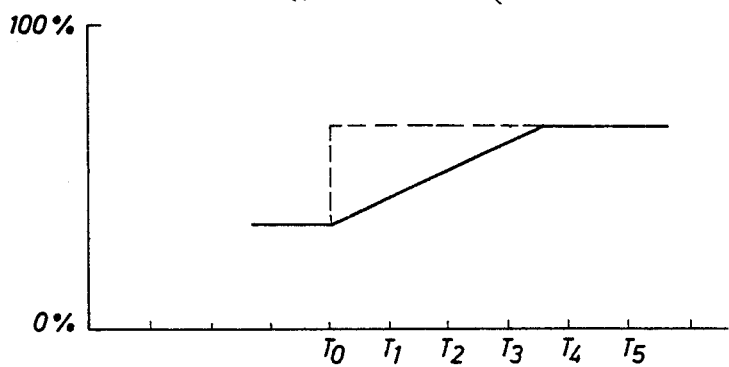
FIG. 2 is a graph showing porosity observed as a function of time, the solid line representing invasion into a gas-filled zone and the broken line a water or oil-filled zone.

The present invention relies upon being initiated when the effects of invasion are negligible. Such measurements cannot be made with a wireline tool because of the need to trip the drill pipe from the hole, prepare the drilling mud for logging and lowering the logging tool into the hole. However, they can often be made with a measuring-while-drilling sensor. Consistent with this, and as a specific example, assume that the porosity at a certain depth is logged at some time $T_O$ with a measuring-while-drilling neutron porosity sensor. Assume further that the formation at this depth is a sand which is partially saturated with gas. The neutron porosity reading will therefore be low. As time elapses, the drilling fluid invades the formation and displaces the gas. After a period of time, the drilling fluid will invade the formation to a radius beyond the depth of investigation of the neutron porosity sensor, time $T_4$ in FIG. 2. A repeat measurement of the same zone with this sensor after such invasion has occurred will therefore produce a higher porosity than was observed before. If the effects of the shale can be neglected, the observed porosity will now be the true formation porosity. The difference between the readings at $T_O$ and $T_4$ will be the gas saturation. If several measurements of neutron porosity are made over a period of time in this formation, they will trace out a curve similar to that shown in FIG. 2. It should be noted that the timing interval or sampling rate are not critical to the present invention. The first sample should be taken as soon as possible after drilling and subsequent samples taken until saturation occurs. For example, $T_1$ could be within 2 hours of drilling and $T_4$ several hours later.

In more detail, the procedure of the present invention is as follows:

First, the composition of the mud filtrate is determined. Generally, it will be sufficient to known only if the mud is an oil or water based mud. Very fine corrections can be made if desired from a knowledge of the chemical composition of the mud filtrate. With the accuracy needed for most applications, this step can be skipped and it can be assumed that the mud filtrate is water, even if it is not.

Second, measure the neutron porosity before the mud filtrate has invaded the formation.

Third, measure the natural gamma radioactivity of the formation.

Fourth, using natural gamma readings from other points in the well, determine the shale saturation of the formation being measured. If no natural gamma readings are available, it may be possible to estimate the shale content from a knowledge of similar sands in the area. Otherwise, steps 2 and 3 above should be skipped, but it should be understood that this may result in error.

The measurements are repeated. Continually increasing porosity readings indicate that invasion is not complete. A constant or sustained reading from two or more later readings indicates invasion is complete and a true porosity has been measured. The fact that invasion has occurred can be verified by making a similar plot of the observed resistivity, also measured while drilling as a function of time. A sustained change in this resistivity reading is an indication of invasion. The measuring-while-drilling resistivity tool will, in general, read deeper into the formation than the neutron porosity sensor. It may also be known from the history of other wells in the area that the invasion should have occurred after a certain period of time. If it can be demonstrated from the resistivity plot or any other means, that invasion is complete to the depth of investigation of the neutron porosity sensor. Then, the observed neutron porosity is the true porosity, except when shale corrections may be needed. If it cannot be demonstrated that the invasion is complete, then no conclusions about true porosity can be drawn. However, we would know that the formation contains gas. If it has been determined that the sand is clean, i.e. that it is shale free, or no information about the shale is available, then the process can proceed.

Little is known at this time about the response of measuring-while-drilling porosity sensors in shales. If knowledge of the shale volume is known, it should be possible to provide a shale correction from a general knowledge of the lithology. As a first approximation, it should be sufficient to simply subtract the shale volume, as a percent, from the observed neutron porosity readings.

The true formation porosity is the shale corrected porosity which has been measured after an increase in the observed neutron porosity to a sustained level. In some cases, it may be desirable to apply a correction as follows:

The response of a neutron porosity sensor to water is very similar to that for most hydrocarbons. However, if great accuracy is desired and if oil based mud is used where it is known that the invaded zone contains residual hydrocarbons (this could be known from historical data on similar wells), the response of the tool should be corrected for the hydrocarbons. This can be accomplished by consulting a standard correction chart for the porosity sensor.

Similarly, if it has been determined that chlorides or other elements known to affect the response of a porosity sensor are present, the readings can be corrected for these elements.

The gas saturation is different between the final and initial porosity readings. This should not require a shale for the chemistry of the invading fluids as indicated above.

The foregoing disclosure and description of the invention is illustrative and explanatory thereof, and various changes in the method steps may be made within the scope of the appended claims without departing from the spirit of the invention.

What is claimed is:

1. A method for determining during the drilling operation the true porosity of a selected region of a subsurface geological formation being traversed by a borehole being bored by a drill string terminated at its lower end in a drill bit, comprising the steps of:
   (a) irradiating said selected region with an initial neutron flux from a neutron source disposed in said drill string above said bit while said bit is making hole;
   (b) measuring a baseline value with a detector disposed in said rill string, said baseline value measured prior to invasion of said selected region with a drilling fluid circulating in said borehole and indicative of the initial concentration of hydrogen atoms in said selected region following said initial neutron irradiation and prior to said invasion;
   (c) irradiating said selected region with a neutron flux from said neutron source during a tripping of said rill string;
   (d) measuring with said detector a value indicative of the concentration of hydrogen atoms in said selected region during said first tripping following said neutron irradiation;
   (e) repeating steps (c) and (d) on successive tripping of said drill string;
   (f) determining a saturated value indicative of the concentration of hydrogen atoms in said selected region after invasion of said region by said drilling fluid is completed by comparing for statistical equality successively measured values indicative of said concentration of hydrogen atoms; and
   (g) determining the true porosity of the formation about said borehole in said selected region from said saturated value.

2. A method for determining during the drilling operation the level of gas saturation in a selected region of a subsurface geological formation being traversed by a borehole being bored by a drill string terminated at its lower end in a drill bit, comprising the steps of:
   (a) irradiating said selected region with an initial neutron flux from a neutron source disposed in said drill string above said bit while said bit is making hole;
   (b) measuring a baseline value with a detector disposed in said drill string, said baseline value measured prior to invasion of said selected region with a drilling fluid circulating in said borehole and indicative of the initial concentration of hydrogen atoms in said selected region following said initial neutron irradiation and prior to said invasion;

(c) irradiating said selected region with a neutron flux from said neutron source during a tripping of said drill string;

(d) measuring with said detector a value indicative of the concentration of hydrogen atoms in said selected region during said first tripping following said neutron irradiation;

(e) repeating steps (c) and (d) on successive tripping of said drill string;

(f) determining a saturated value indicative of the concentration of hydrogen atoms in said selected region after invasion of said region by said drilling fluid is completed by comparing for statistical equality successively measured values indicative of said concentration of hydrogen atoms; and (g) determining the level of gas saturation in the formation about said borehole in said selected region from the difference between said saturated value and said baseline value.

* * * * *

UNITED STATES PATENT AND TRADEMARK OFFICE
CERTIFICATE OF CORRECTION

PATENT NO. : 4,810,459

DATED : March 7, 1989

INVENTOR(S) : John E. Fontenot

It is certified that error appears in the above-identified patent and that said Letters Patent is hereby corrected as shown below:

Column 6, Line 31, delete "rill" and insert therefor --drill--.

Column 6, Line 39, delete "rill" and insert therefor --drill--.

Signed and Sealed this

Twelfth Day of September, 1989

Attest:

DONALD J. QUIGG

Attesting Officer

Commissioner of Patents and Trademarks